Sept. 5, 1967   M. G. STROMQUIST   3,339,645
PIPE DRIVING ATTACHMENT
Filed Feb. 1, 1965
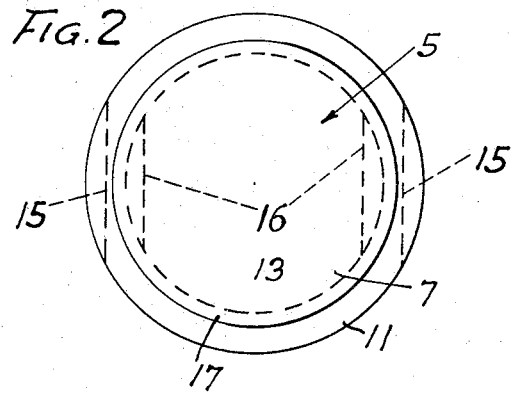
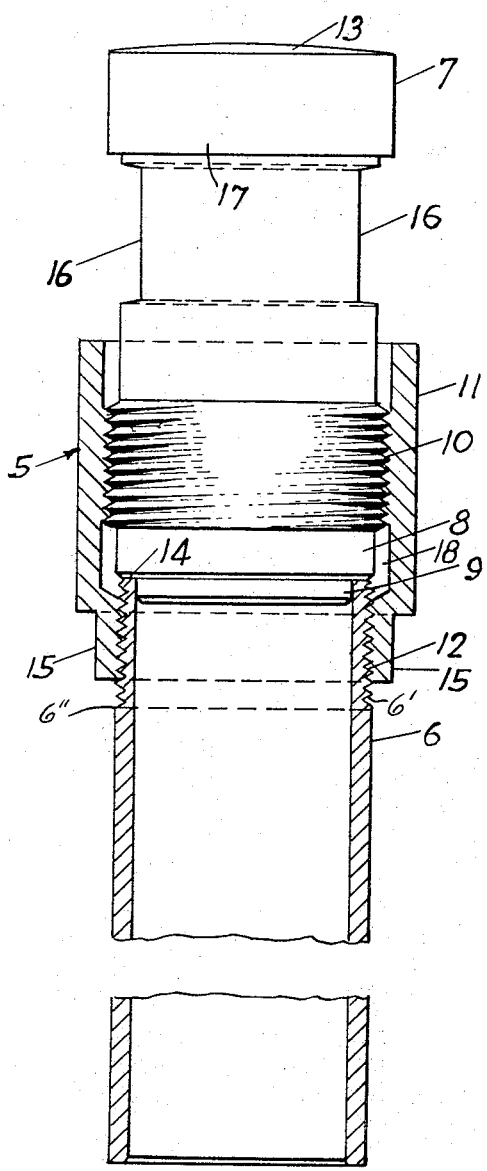
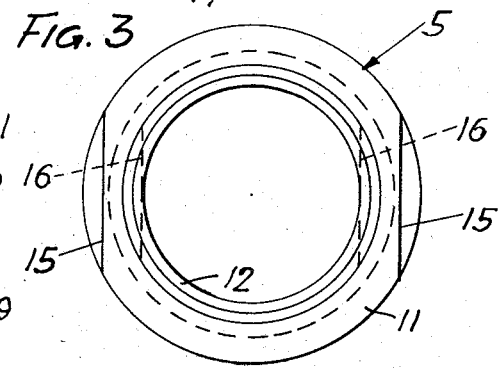
INVENTOR
Martin G. Stromquist
ATTORNEY

3,339,645
PIPE DRIVING ATTACHMENT
Martin G. Stromquist, 123 S. London Ave.,
Rockford, Ill. 61108
Filed Feb. 1, 1965, Ser. No. 429,275
2 Claims. (Cl. 173—132)

This invention relates to a driving attachment for pipes designed to avoid ruining the threaded outer end whenever and wherever pipes have to be driven into the ground by hammering on the outer end.

The salient feature of the pipe driving attachment of my invention is the distribution of the force applied to such an extent that there is never any danger of stripping threads or swedging any part, and hence the attachment will fill a long felt need.

The invention is illustrated in the accompanying drawing, in which:

FIG. 1 is a longitudinal section through a pipe driving attachment of my invention shown applied to a pipe to be driven, only the sleeve portion of the attachment being shown in section;

FIG. 2 is an end view of the pipe driving attachment from the upper end, and

FIG. 3 is an end view from the lower end.

The same reference numerals are applied to corresponding parts throughout these views.

Referring to the drawing, the reference numeral 5 designates the pipe driving attachment of my invention generally, which is here shown threaded onto the upper end of a pipe 6 that is to be driven into the ground, as, for example, in building a pier, and wherever a problem was presented in the driving of pipes into the ground by hammering on the outer end, to avoid swedging and otherwise ruining the threaded end in such hammering. The present attachment 5 definitely has solved the problem, as actual use of it has shown. It comprises the generally cylindrical plug shaped driver body 7 having a reduced lower end extension 8 bearing against the threaded end of the pipe 6, with or without a further reduced pilot end portion 9 fitting neatly in the end of the pipe 6. Driver 7 is threaded near its lower end, as indicated at 10, in a sleeve 11, and the sleeve has an internally threaded reduced lower end 12 which threads onto the externally threaded upper end 6' of the pipe 6. Thus, the impact or force of the hammer blows at 13 on the enlarged upper end 17 of the body 7 is distributed three ways:

(1) At the multiplicity of threads 10;
(2) At the multiplicity of threads 12, and
(3) At the flat annular surface 14 on the lower end of the reduced extension portion 8 abutting the flat upper end of pipe 6.

In operation, the pipe 6 is threaded into the lower end of the sleeve 11 as far or nearly as far as it will go and then the driver 7 is threaded into the upper end of sleeve 11 far enough to abut the reduced end 8 with the upper end of pipe 6, as at 14, and, of course, at the same time engage the reduced pilot end portion 9 in the upper end of the pipe. The reduced end 8 is preferably too large to enter the reduced lower end portion 15 of the sleeve 11. If the pipe 6 is threaded into sleeve 11 as far as it will go, a fourth place to assume the force of the hammer blows at 13 is the annular shoulder 6'' at the lower end of the threads 6' on the pipe. The larger diameter of the threads 10 in relation to the threads 6' on the pipe is of advantage in proportionately decreasing the unit pressure per square inch to be assumed by the two sets of threads at 10 and 12, and accordingly also at 14 and 6'', thereby greatly reducing the likelihood of any threads being stripped or distorted, or of any swedging occurring at 14 and 6''. No wrench is needed for either of the aforementioned threading operations at the outset nor usually in unthreading afterward, but diametrically opposed flats 15 can be milled on the lower portion of sleeve 11 onto which a wrench can be applied, and similar flats 16 can be milled on diametrically opposite sides of the driver 7 below the enlarged end 17 to accommodate another wrench so as to enable easily loosening the parts from one another and unthreading the attachment 5 from the upper end of the pipe 6. For larger diameters of pipe driving attachments I may have radial holes drilled and tapped at 90° intervals at the level of the flats 15 and 16, instead of these flats, and thread in radial rods to use as levers for loosening the parts. A big advantage of the present attachment, aside from the important one of saving the threads on the pipe 6, is the fact that there is never any danger of the driving attachment 5 falling off the pipe and being lost in the water in doing a pier job. The clearance relief indicated at 18 in the lower end of sleeve 11 is important because it permits having solid engagement of driver plug 7 on pipe 6 at 14 regardless of the length of the threaded connection at 10. The close fit of the reduced pilot end portion 9 in the outer end of the pipe prevents any swedging of the end of the pipe in the hammering and thereby further distributes at a fifth point the impact of the hammer blows.

It is believed the foregoing description conveys a good understanding of the objects and advantages of my invention. The appended claims have been drawn to cover all legitimate modifications and adaptations.

I claim:

1. A two-piece pipe driver attachment for application to and use in driving a pipe that is threaded on the end that is to be hammered, said two-piece attachment comprising an elongated sleeve having a main body portion and a reduced end portion, there being a multiplicity of internal threads of one diameter in the main body portion and another multiplicity of internal threads of a smaller diameter in the reduced end portion, the reduced end portion being threadable on the threaded end of the pipe so that the pipe projects into the main body portion of said sleeve, and an elongated, generally cylindrical, solid plug-shaped driver body having an enlarged outer end which is adapted to receive the hammer blows, the other end portion of said plug being enlarged and externally threaded to thread in the main body portion of said sleeve, the latter end portion of said plug having a reduced cylindrical extremity with a flat end surface thereon normal to its axis abutting a flat end surface on the threaded end of the pipe in inwardly spaced relation to the reduced end portion of the sleeve, whereby the force of the hammer blows is distributed mainly between the two multiple thread threaded connections recited and the intermediate surface to surface abutment of the reduced extremity of said plug on the threaded end of said pipe.

2. An attachment as set forth in claim 1 wherein the reduced extremity of the plug has a further reduced pilot end portion thereon entered in the threaded end of the pipe with a close fit, thereby preventing swedging of the threaded end of the pipe as the impact of the hammer blows is further distributed at this point.

(References on following page)

References Cited

UNITED STATES PATENTS

| | | | |
|---|---|---|---|
| 710,860 | 10/1902 | Guthrie | 173—128 |
| 722,866 | 3/1903 | Mack | 173—132 |
| 765,864 | 7/1904 | Thomas | 173—128 |
| 900,140 | 10/1908 | Whitehall | 173—132 |
| 2,251,113 | 7/1941 | Chapman | 173—131 |
| 2,788,992 | 4/1957 | Vienne et al. | 285—177 |
| 2,896,955 | 7/1959 | Treppard | 287—117 |

FRED C. MATTERN, Jr., *Primary Examiner.*

L. P. KESSLER, *Assistant Examiner.*